United States Patent
Kisaka et al.

[11] Patent Number: 5,923,491
[45] Date of Patent: *Jul. 13, 1999

[54] DISK DRIVE SERVO CONTROL SYSTEM WITH SELECTABLE FILTERING FOR REDUCTION OF REPEATABLE RUNOUT

[75] Inventors: Masashi Kisaka, Yokohama; Nobuyuki Kitazaki; Takashi Nakamura, both of Fujisawa; Yuji Yokoe; Isao Yoneda, both of Yokohama, all of Japan

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/681,411

[22] Filed: Jul. 22, 1996

[30] Foreign Application Priority Data

Sep. 25, 1995 [JP] Japan ................................. 7-246263

[51] Int. Cl.$^6$ .................................................. G11B 5/596
[52] U.S. Cl. .................................. 360/77.04; 360/77.08; 360/53; 360/65
[58] Field of Search .......................... 360/77.08, 77.04, 360/77.06, 73.05, 78.05, 78.09, 78.11, 53, 65; 375/229

[56] References Cited

U.S. PATENT DOCUMENTS

| | | | |
|---|---|---|---|
| 4,096,534 | 6/1978 | Brownback et al. | 360/78.06 |
| 4,616,276 | 10/1986 | Workman | 360/77 |
| 5,065,263 | 11/1991 | Yoshida et al. | 360/77.03 |
| 5,072,318 | 12/1991 | Yu | 360/77.02 |
| 5,210,660 | 5/1993 | Hetzler | 360/51 |
| 5,257,252 | 10/1993 | Barnes et al. | 369/44.29 |
| 5,444,583 | 8/1995 | Ehrlich et al. | 360/78.09 |
| 5,535,072 | 7/1996 | Witt et al. | 360/99.06 |
| 5,539,714 | 7/1996 | Andrews, Jr. et al. | 360/77.04 |
| 5,550,685 | 8/1996 | Drouin | 360/77.04 |
| 5,553,086 | 9/1996 | Sompel et al. | 360/75 |

OTHER PUBLICATIONS

Anonymous, "Iterative Feedforward Error Sum Method for ACRMS Reduction in Direct Access Storage Device Files", Research Disclosure, Jul. 1992 vol. 339, No. 33903.

Jefferson et al, "Head–Disk Spacing Controller for Magnetic Recording", IBM Technical Disclosure Bulletin, vol. 31 No. 11, Apr. 1989, pp. 240–241.

*Primary Examiner*—Nabil Hindi
*Attorney, Agent, or Firm*—Merchant, Gould, Smith, Edell, Welter & Schmidt, P.A.

[57] ABSTRACT

The present invention determines whether a filter is used for reading and writing on a disk to correct repeatable runout. The invention estimates the magnitude of repeatable runout for each disk by measuring the maximum absolute value of a state variable of a filter when the disk is turned on or when the disk returns from a sleep mode, and compares the measured value to a predetermined criterion such as the track width. If the magnitude of the repeatable runout is less than or equal to the predetermined criterion, the filter is not used. If the magnitude of the repeatable runout exceeds the predetermined criterion, the invention reads and writes data using the filter.

24 Claims, 7 Drawing Sheets

DISK DRIVE SERVO CONTROL SYSTEM WITH SELECTABLE FILTERING FOR REDUCTION OF REPEATABLE RUNOUT

BACKGROUND OF THE INVENTION

1. Technical Field

The present invention relates to a method and apparatus for a servo control system in a disk drive, and more particularly to a method and apparatus for avoiding repeatable runout errors in a disk drive.

2. Description of the Background Art

In a disk drive, such as a magnetic hard disk drive, a storage disk has a plurality of concentric tracks for storing information. The disk drive positions a transducer or read/write head over a desired track to read data from or write data to the disk. The movement of the head to a desired track is referred to as "seeking." Maintaining the head over the center of the desired track during read or write operations is referred to as track "following." These operations are controlled by a servo control system using prerecorded servo information either on a dedicated servo disk or on sectors interspersed among the data on a data disk. An example of a sectored servo disk drive architecture is provided in commonly owned U.S. Pat. No. 5,210,660.

Servo information in an embedded servo disk format typically includes a grey code or track identifier region comprising, for example, a cylinder or track number and sector number, enabling the servo electronics to seek to an appropriate track and data region. The servo information further comprises alignment information, such as a burst pattern used by the servo electronics to align the head with respect to the center of a desired track, e.g. when reading and writing data to the disk. During track following, the servo burst information sensed by the head is demodulated to generate sampled head position error signals indicating the deviation of the head from the track center. The position error signal is then further processed to produce a position signal. The servo feedback loop uses the position signal to generate a control signal to the actuator to move the head back to the track center.

Several factors cause the head to be off the track center during track following, and therefore affect the position signal. Certain position signal components have a low frequency, i.e. a frequency close to the frequency of the disk rotation, and repeat with disk rotation. For example, if the disk is not precisely centered over the axis of rotation of the spindle motor, the tracks will have an eccentric shape relative to the axis of rotation. The eccentric shape of the tracks causes a repeatable error at the same frequency as the disk rotation. Similarly, even if the disk is precisely mounted about the spindle motor axis, the spindle motor axis can wobble during rotation. The wobble will also generate repeatable errors, typically at the fundamental and second harmonic frequencies of the disk rotational frequency. Mechanical disturbances during servo writing are another potential cause of repeatable error, as is disk deformation. The problem of repeatable error is magnified in disk files which have multiple disks, because each disk and each disk surface will have its own unique repeatable error signature. For purposes of this disclosure, all of the preceding causes of repeatable error, and others generally understood in the art, will be referred to as repeatable runout.

Generally, a feedback control system controls the position of the head by generating an electrical control signal in response to the position signal. The control signal causes the head to move to a target position. However, the control signal is often less than ideal due to additional factors in the system. For example, repeatable runout is a disturbance that the control system cannot follow. Consequently, the deviation of the head from the target position may exceed an allowable value.

To accurately follow a track despite repeatable errors, a control system may use either the measured or predicted repeatable error to generate a signal which modifies the control signal to the actuator so that the head follows the true shape of the track center. One example of such a control system uses a digital filter having a high gain for particular frequency components. Control signals are input to the digital filter, which modifies the control signal to match the frequency characteristic of the repeatable error. In conventional disk drives, the filter is used to counteract read errors only after repeatable runout errors have been detected. Therefore, such errors are not prevented, e.g., when the disk drive is first turned on or when returning from sleep mode. In the state of the storage device referred to as "sleep mode", the power to the control system is turned off after a predetermined time interval. In either circumstance, the inability to filter out repeatable runout may prevent data retrieval, e.g. the retrieval of microcode stored on the disk and required for normal drive operations.

SUMMARY OF THE INVENTION

A principal object of the present invention, therefore, is to prevent errors from repeatable runout by determining a repeatable error and selectively modifying the head position to reduce the repeatable error, even, e.g., at power-up or when returning from sleep mode.

Another object of the invention is to enable reading of microcode stored on the disk even if predetermined repeatable runout occurs by enabling continuous use of the filter.

In view of the foregoing objects, the present invention provides a method and apparatus for reducing repeatable runout errors in a disk drive. The apparatus includes a rotatable disk having at least one track, a head, a determination means, and a modification means. The determination means determines a repeatable error from the position of the head relative to a target position. The modification means selectively modifies the head position using the magnitude of the repeatable error to reduce the repeatable error.

The method of the present invention similarly removes repeatable error in a disk drive as previously described. The method comprises the following steps: determining a repeatable error from the position of the head relative to a target position, and selectively modifying the head position using the magnitude of the repeatable error to reduce the repeatable error.

In addition, the present invention determines whether a filter should be used for reading or writing data to the disk by estimating the amount of repeatable disk runout by measuring the maximum value of a state variable of the filter at times when the filter would otherwise be unavailable, e.g., when the disk drive is initially powered on or when returning from the sleep mode, and comparing the value with a predetermined criterion. A table of state variables and corresponding maximum runout values is then constructed and used to control the filter. If the amount of runout is less than or equal to the predetermined criterion, the filter is not used. However, if the amount of runout exceeds the predetermined criterion, then data is subsequently read or written using the filter. As a result, microcode or other information is guaranteed to be read rapidly from the disk.

BRIEF DESCRIPTION OF THE DRAWINGS

The foregoing and other objects, features and advantages of the present invention will be apparent from the following detailed description of the preferred embodiments of the invention, reference being made to the accompanying drawing, in which like reference numerals indicate like parts and in which.

DETAILED DESCRIPTION OF THE PREFERRED EMBODIMENTS

The invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture according to the invention.

Figure 1:
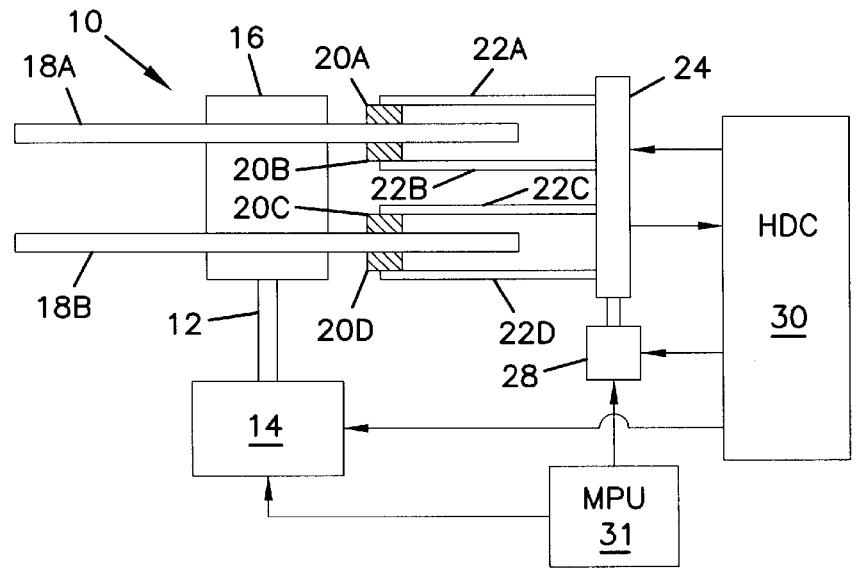
FIG. 1 is a diagram of a disk drive suitable for practicing the present invention.

A preferred embodiment of the present invention will hereinafter be described with reference to the drawings. Referring to FIG. 1, a hard disk drive (HDD) 10 suitable for practicing the present invention is shown. The HDD 10 has a spindle drive unit 14 which rotates a shaft 12 at a constant speed when powered. The shaft 12 is mounted with a cylindrical spindle 16. The axis of the cylindrical spindle 16 is aligned with the axis of the shaft 12. Disks 18 are mounted on the outside diameter of the spindle 16 and rotate with the spindle at high speed.

The HDD 10 has magnetic heads 20A–20D corresponding to each surface of the disks 18. Each head has a read element and a write element. Each head is mounted at the front end of access arms 22A–22D, respectively, and flies over the disk surface when the disk rotates. The ends of the access arms 22A–22D opposite the heads are mounted on a shaft 24 which is driven by an actuator, drive unit or VCM driver 28. A hard disc controller (HDC) 30 and microprocessing unit (MPU) or controller 31 control the HDD 10. The disk drive design of FIG. 1 is provided for purposes of illustration. The invention is not meant to be limited, however, to a particular disk drive design.

Figure 2:
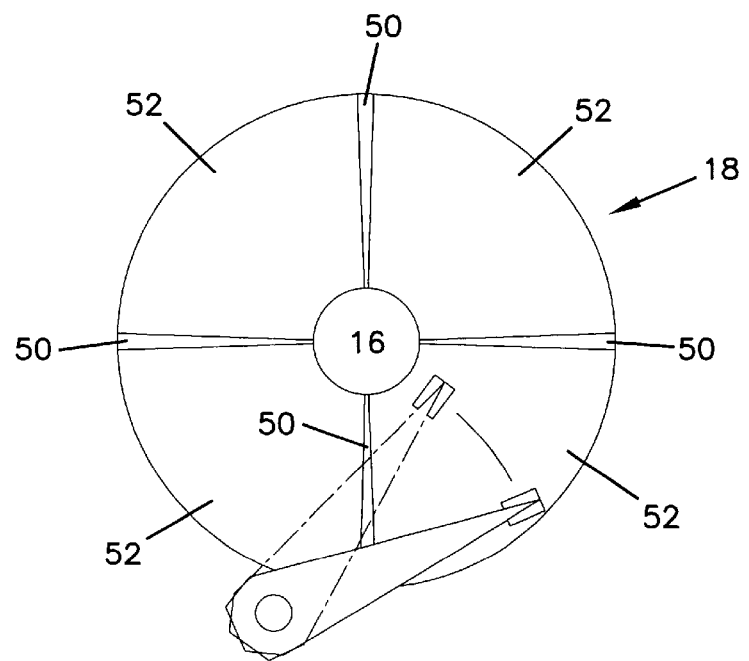
FIG. 2 is a diagram of data and servo regions of a disk drive suitable for practicing the present invention.

Referring to FIG. 2, a diagram of data and servo regions in a sectored servo disk drive suitable for practicing the present invention is shown. The disk 18 has a circular shape and predetermined thickness, and is secured to the spindle 16. Each surface of disk 18 is used to record data. The disk surface has a plurality of servo regions 50 extending radially, in this case, across the disk. Data regions 52 are formed between servo regions.

Figure 3:
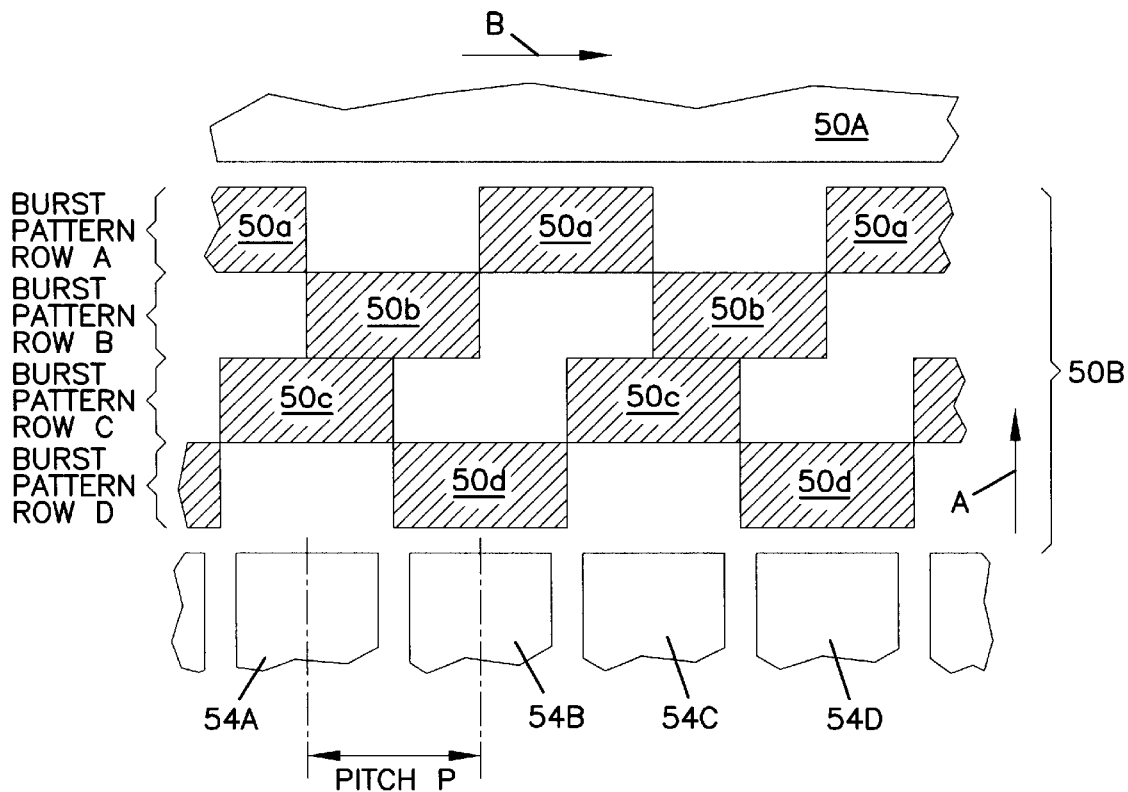
FIG. 3 is a diagram of a servo burst pattern for a track suitable for practicing the present invention.

Referring to FIG. 3, a diagram of the servo burst pattern for a track of a disk suitable for practicing the present invention is shown. FIG. 3 shows a portion of the servo regions 50 and data regions 52. A plurality of concentric tracks 54A–54D are formed in the data regions 52 at a predetermined pitch P. The head reads and writes data on each data track in the direction of arrow A.

The servo region has a track identification information region 50A and an alignment information region, i.e. burst pattern region 50B. The track identification information region 50A includes a grey code or address indicative of the data track 54. The burst pattern region 50B has a burst pattern consisting of four burst pattern rows A–D. Each burst pattern row has alternating regions of recorded signals (shaded) and regions without recorded signals (not shaded) radially aligned on the disk and aligned relative to the data tracks 54.

Burst pattern rows A and B have signals recorded in regions 50a and 50b. The signal recorded regions 50a and 50b of the burst pattern rows A and B are staggered radially across the disk 18. The edges of regions 50a and 50b are aligned and correspond to the center of each data track. In addition, burst pattern rows C and D are formed by recording signals in regions 50c and 50d. The signal recorded regions 50c and 50d of burst pattern rows C and D are also staggered radially across the disk 18. The edges of regions 50c and 50d are aligned and correspond to the boundary between adjacent tracks.

Figure 4:
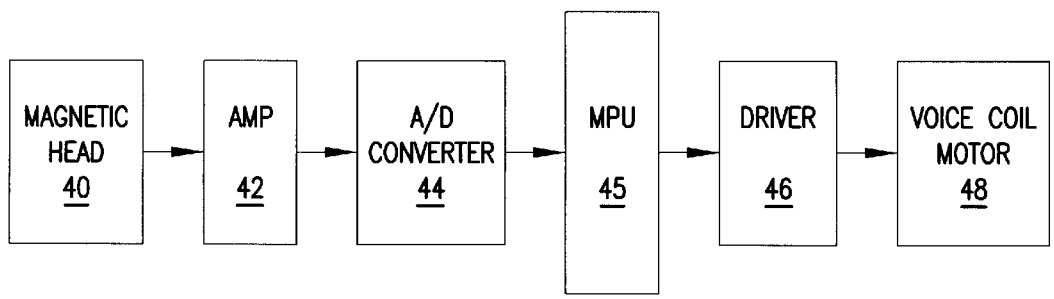
FIG. 4 is a block diagram of the configuration relating to the position control of a head in a disk drive suitable for practicing the present invention.

Referring now to FIG. 4, a block diagram of the configuration relating to the position control of a head in a disk drive as suitable for practicing the present invention is shown. Each head 40 is coupled to an amplifier (AMP) 42 so that its output is amplified. The output of AMP 42 is input to an analog to digital (A/D) converter 44, and the digitized signal is then input to the MPU 45.

The MPU 45 determines the position of the head 40 from the signal from the A/D converter 44, and sends a signal for controlling the head position to a driver 46. The control signal is based on the deviation between the sensed head position and the target (desired) head position, and controls the current applied to the actuator motor, which comprises, for example a voice coil motor (VCM) 48 or similar device as is known to those skilled in the art.

Figure 5:
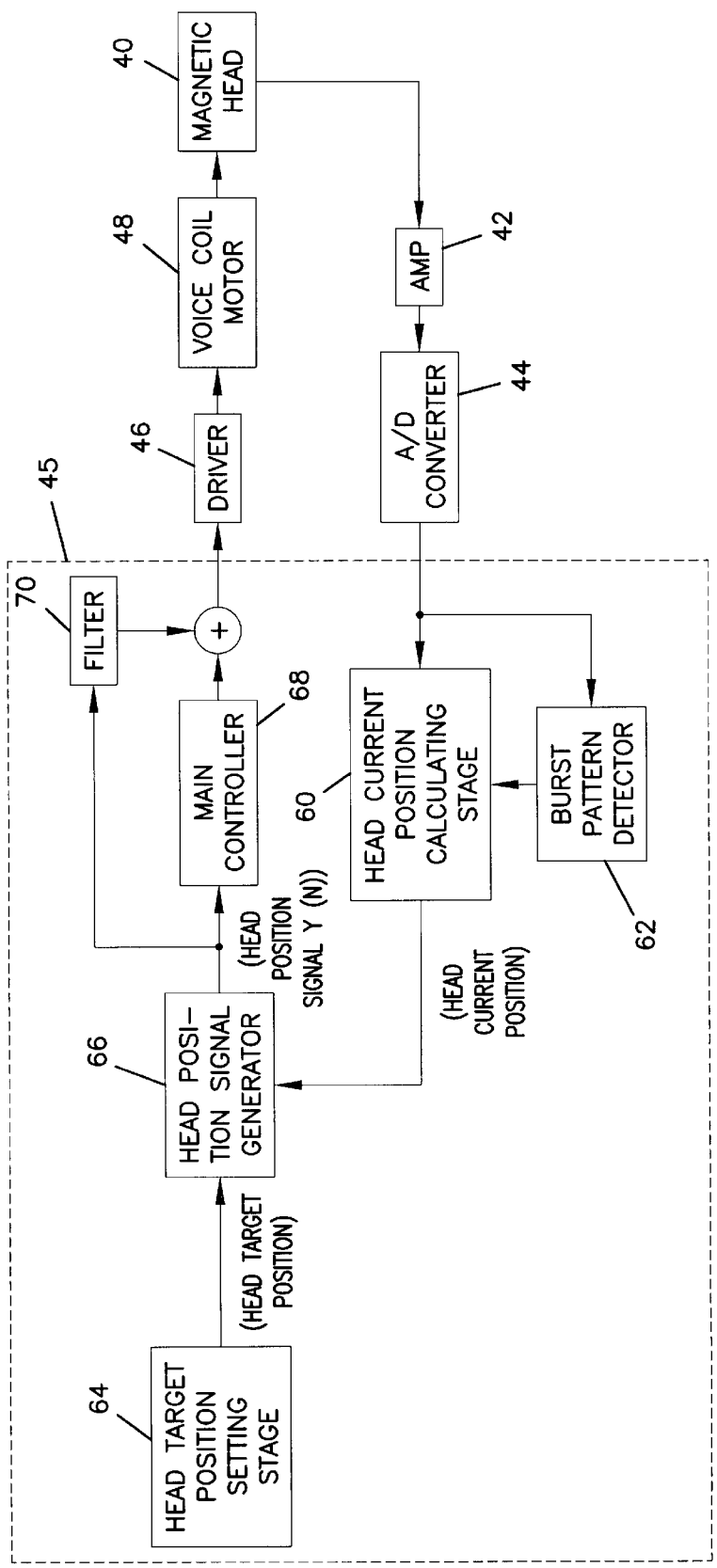
FIG. 5 is a block diagram of the configuration inside a microprocessing unit relating to controlling the position of a head in the disk drive according to the present invention.

Referring to FIG. 5, a block diagram of the configuration inside the MPU 45 responsible for controlling the head position during track following in the disk drive of the present invention is shown. The driver 46, voice coil motor 48, head 40, AMP 42, and A/D converter 44 were described above. The output signal from the A/D converter 44 is input to the current head position calculating stage 60 and a burst pattern detector 62 of MPU 45. The burst pattern detector 62 determines if the head is over the burst pattern region, and outputs the result of the determination to the current head position calculating stage 60. If the head is over a burst pattern region, then the current head position calculating stage 60 receives a signal from the A/D converter 44, calculates the current radial head position over the disk, and outputs the current head position to the head position signal generator 66. The current head position is determined at predetermined intervals.

A head target position setting stage 64 sets and outputs the target head position to the head position signal generator 66. To determine error, the head position signal generator 66 compares the target head position to the current head position, and outputs an error signal y(n) which indicates the magnitude and direction of the deviation from the target position. As is well-known, the target head position typically is the track center.

The error signal y(n) is input to a main controller 68 which sends a control signal to the driver 46 based on the signal y(n). If there is repeatable runout, e.g. due to the disk center being eccentric relative to the spindle center, the deviation between the target head position and current head position has a cyclic repeatable error.

A filter 70 corrects the repeatable errors, e.g. when writing data. Errors are corrected by using the filter, which preferably comprises a narrow bandwidth digital filter with high gain for a predicted frequency and a low gain for other frequencies, to process the head position signal y(n) in the main controller 68. The resulting control signal varies with the repeatable error because the filter frequencies follow the cycle of the repeated error. Because the repeatable runout is a function of the disk rotation frequency, the filter's 70 characteristics will preferably be selected on the basis of the disk rotation frequency. The present invention uses the filter not only against a detected error, but also at system start-up and when returning from the sleep mode (i.e., the power save mode), thus providing error correction whenever repeatable runout may be present.

Figure 6:
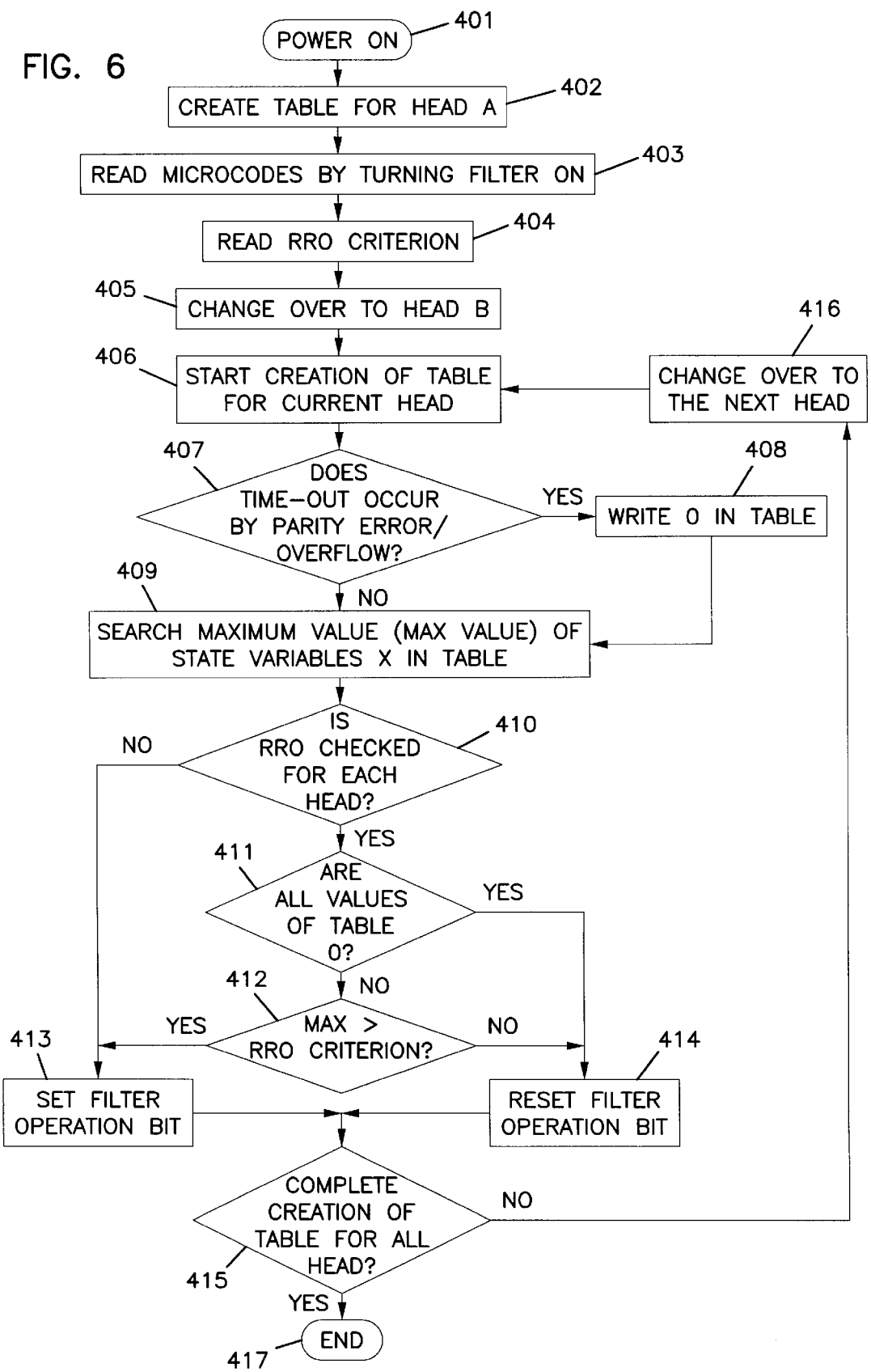
FIG. 6 is a flowchart of the procedure to determine use of the filter to control the position of the head according to the present invention.

Referring to FIG. 6, a flowchart of the head position control procedure for the disk drive of the present invention is shown. It will be understood that step 401 may be entered either at power-on or when returning from sleep mode, i.e., when the head control system changes from the OFF state to the ON state, and data needs to be read from the disk. When the power is turned on or when returning from the sleep mode, microcode for reading and writing or other predetermined data, such as servo parameters, channel parameters, or a password, needs to be read from the disk.

Proceeding to step 402, a filter table of state variables is created at a predetermined track. The state variables are selected to compensate for measured repeatable runout (RRO), and are determined prior to reading microcode from the disk in the next step 403, and prior to moving the head to a cylinder (track) on the disk where the microcode is written. Step 402 creates a table consisting of each servo sector number and its corresponding state variable $X_n$ by reading the servo information on the predetermined track, and performing track following for several rotations. This process will be described in greater detail subsequently.

In step 403, microcode or other data is read from the disk using the filter and the filter table values from step 402. Since the filter table already includes appropriate filter state variable values $X_n$, for each sector number, the filter state variable is set according to those values so that the head can immediately and accurately follow the track on which the microcode or other predetermined data are written, despite repeatable runout. In step 404, the predetermined RRO criterion is read. The RRO criterion is a reference value defining the threshold amount of repeatable runout required to set the filter switch. The RRO criterion is previously recorded on the track storing the microcode or other predetermined data.

In step 405, the read head is changed to head B. In subsequent steps, it is determined whether the filter is needed for reading and writing using head B. In step 406, creation of a filter table for head B is initiated by following the predetermined track as previously described. Step 407 determines whether a time out occurs before the table is completed because of some error. If a time out occurs, step 407 advances to step 408 and zeroes are written in the filter table. If time out does not occur, step 407 advances to step 409.

In step 409, the filter table is searched for the maximum absolute value of the state variable X. Step 409 advances to step 410. Step 410 determines if the system requested creation of the table for each head. If YES, then repeatable runout is checked for each head, and the procedure advances to step 411. If NO, the procedure advances to step 413 where the filter operation common to the entire disk drive is performed.

In step 411, the state of the RRO is examined for the current head based on the filter table created in step 406. If the filter table is not all zeroes, then it is determined that the table was created normally, and the procedure advances to step 412. If the filter table contains all zeroes, it is determined that the table is not normally created (zeroes were recorded in the table in step 409), and step 411 advances to step 414. In step 414, a filter operation bit is reset such that the filter table will not be used, and the procedure advances to step 415.

In step 412, the maximum absolute value (MAX) is compared with the RRO criterion. If MAX exceeds the RRO criterion, the procedure advances to step 413. In step 413, the filter operation bit is set to enable use of the filter, and step 413 proceeds to step 415. If MAX does not exceed the RRO criterion, the procedure advances to step 414, the filter operation bit is reset, and step 414 proceeds to step 415.

Step 415 checks if the filter tables are created for all heads. If NO, the procedure advances to step 416 which changes the head, and then advances to step 406. If YES, then the filter tables have been created for all heads, and the procedure ends at step 417.

Figure 7:
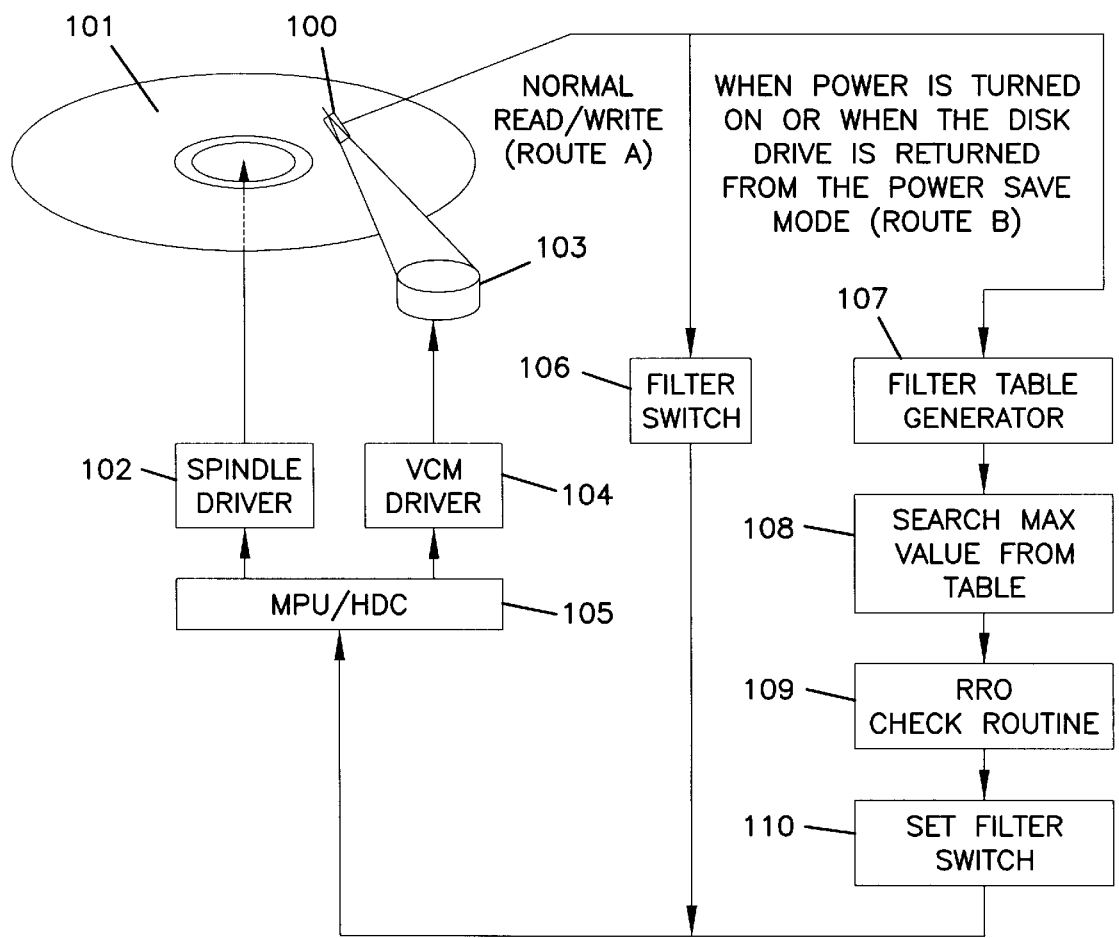
FIG. 7 is a block diagram showing how the filter is used to control head position in the disk drive according to the present invention.

Referring now to FIG. 7, a block diagram showing how the filter is used to control the head position in the disk drive of the present invention is shown. A head 100 is positioned over a disk 101 to read or write data. A VCM 103 positions the head 100 relative to the disk 101. A microprocessing unit/hard disk controller 105 controls the disk rotation and the head position using a spindle driver 102 and a VCM driver 104, respectively.

Figure 8:
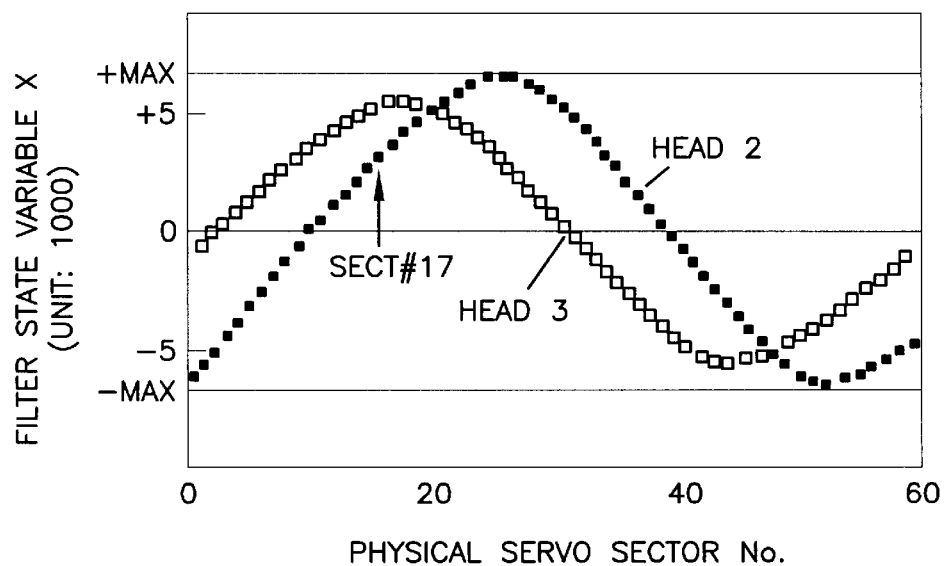
FIG. 8 is a graph showing the correspondence between the sector number and a filter state variable according to the present invention.

The head 100 reads the position information from the disk using Route A during normal operating conditions after repeatable runout is known, and using Route B when power is turned on or when the disk drive returns from the sleep mode, i.e., when repeatable runout is not known. In Route B, the sampled burst signal, read by the head, is input to a filter table generator 107. In the filter table generator 107, the deviation from current to target position is determined from the sampled burst signals at each servo sector to create a table of filter state variables corresponding to each servo sector. The resulting filter table data is shown in FIG. 8.

When creating the filter table 107, the filter is enabled for the predetermined, arbitrarily selected track, and the track is followed for approximately three to five rotations. The filter state variables over the rotations converge to a sine wave having a specific frequency and maximum amplitude. That is, a sine wave is drawn by plotting the servo sector numbers on the abscissa, and the corresponding the filter state variable values on the ordinate. The specific frequency of the sine wave is a component of the repeatable runout. After the sine wave stabilizes, the filter stores a value for the state variable $X_n$ at each servo sector $N_0$ for a single rotation of the track.

Calculation of state variables is dependent upon the type of filter used. In the preferred embodiment, a band elimination filter is used, and state variables are defined by the following equations:

$$X_n = 2 \times \cos(2\pi/N) \times X_{n-1} - Y_{n-1} + \delta_n$$

$$Y_n = X_{n-1}$$

$$\text{int\_next} = A \times X_n + B \times Y_n$$

where:

n: current servo track position $X_n$: filter state variable 1 at sector n $Y_n$: filter state variable 2 at sector n $\delta_n$: amount of offset at sector n N: number of servo sectors in a track int_next: integer value used for the next servo track, n+1

As will be understood by those having ordinary skill in the art, the filter is effective for a frequency with cycle $2\pi$, and has a position error signal $\delta_n$ at a servo sector n, three constants, and two state variables. The three constants are: $\cos(2\pi/N)$, A, and B. $\cos(2\pi/N)$ is constant for the repeatable runout component. A and B are control variables for the filter, and are selected to eliminate the frequency component. The magnitude of state variable $Y_n$ is substantially equal to the magnitude of $X_{n-1}$ (the sector prior to $X_n$), with its phase always delayed by $2\pi/N$ from state variable $X_n$.

When the filter is turned on, $X_n$ and $Y_n$ are initialized to $(X_n, Y_n) = (0, 0)$. Thereafter, the value of $(X_n, Y_n)$ is calculated for each sector using the above equations. When the disk rotates for several rotations, e.g., approximately three to five, the value of $(X_n, Y_n)$ for each sector takes on values such that a sine wave is formed by plotting the values of $X_n$ on the abscissa and $Y_n$ on the ordinate as previously described. Therefore, the values of $X_n$ are tabulated.

Figure 9:
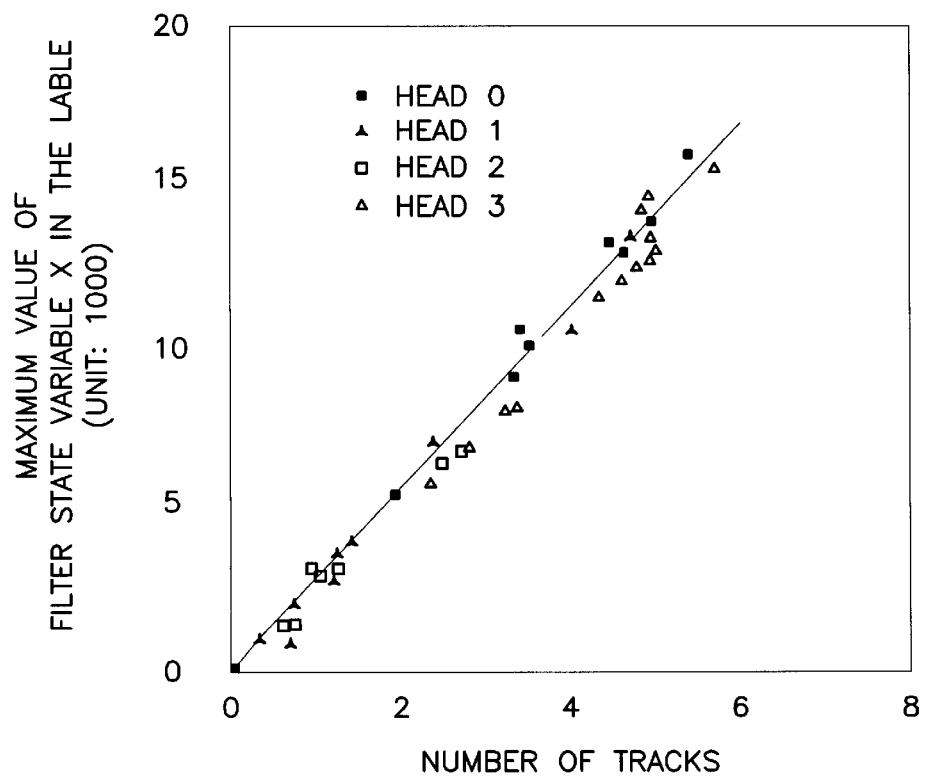
FIG. 9 is a graph showing the relationship between the maximum value of a filter state variable and the number of tracks according to the present invention.

In step 108 of Route B, the filter table is searched for the maximum absolute value of the filter state variable X. That is, the maximum value of the state variable X at a peak of the graph of FIG. 8 is found. Proceeding to step 109, an RRO check routine finds the amount of RRO from the filter state variable X, and compares it to the predetermined RRO criterion (reference value). In FIG. 9, a table for finding the amount of RRO in the check routine is shown. The amount of RRO is determined by the maximum value of the filter state variable X. FIG. 9 shows that the maximum value of the filter state variables X is proportional to the amount of displacement from repeatable runout.

The filter state variable $X_n$ is proportional to the VCM current for controlling the position of the actuator. The VCM current flows in a direction canceling the RRO displacement and is proportional to the actuator's angular acceleration. That is, a large amount of runout causes a higher VCM current when the value of the state variable is increasing. Thus the maximum value of the filter state variable is proportional to the amount of displacement, hence the amount of RRO is estimated from the filter state variable.

The table representing the maximum value of the state variable of the filter and the amount of RRO (FIG. 9) is created and stored for each hard disk drive because the values used to control the VCM current, such as gain, vary among systems. Therefore, the amount of runout corresponding to the maximum value of state variable 1(X) is found from actual measurements and stored in the system in a table.

In the set filter switch routine 110 of FIG. 7, if the magnitude of measured RRO from step 109 exceeds the predetermined RRO criterion, the filter switch is set. If the measured runout is less than the predetermined RRO criterion value, the filter switch is not set. Preferably, the predetermined RRO criterion is one track width. That is, if the magnitude of repeatable runout is less than or equal to one track width, then repeatable runout is not a problem in reading or writing data and use of the filter is not necessary. The RRO criterion is not limited to one track, and it is preferable to provide a RRO criterion suitable for each disk drive. Subsequent routines follow Route A for normal reading and writing operations in the state where the filter switch 106 was previously set or reset.

Figure 10:
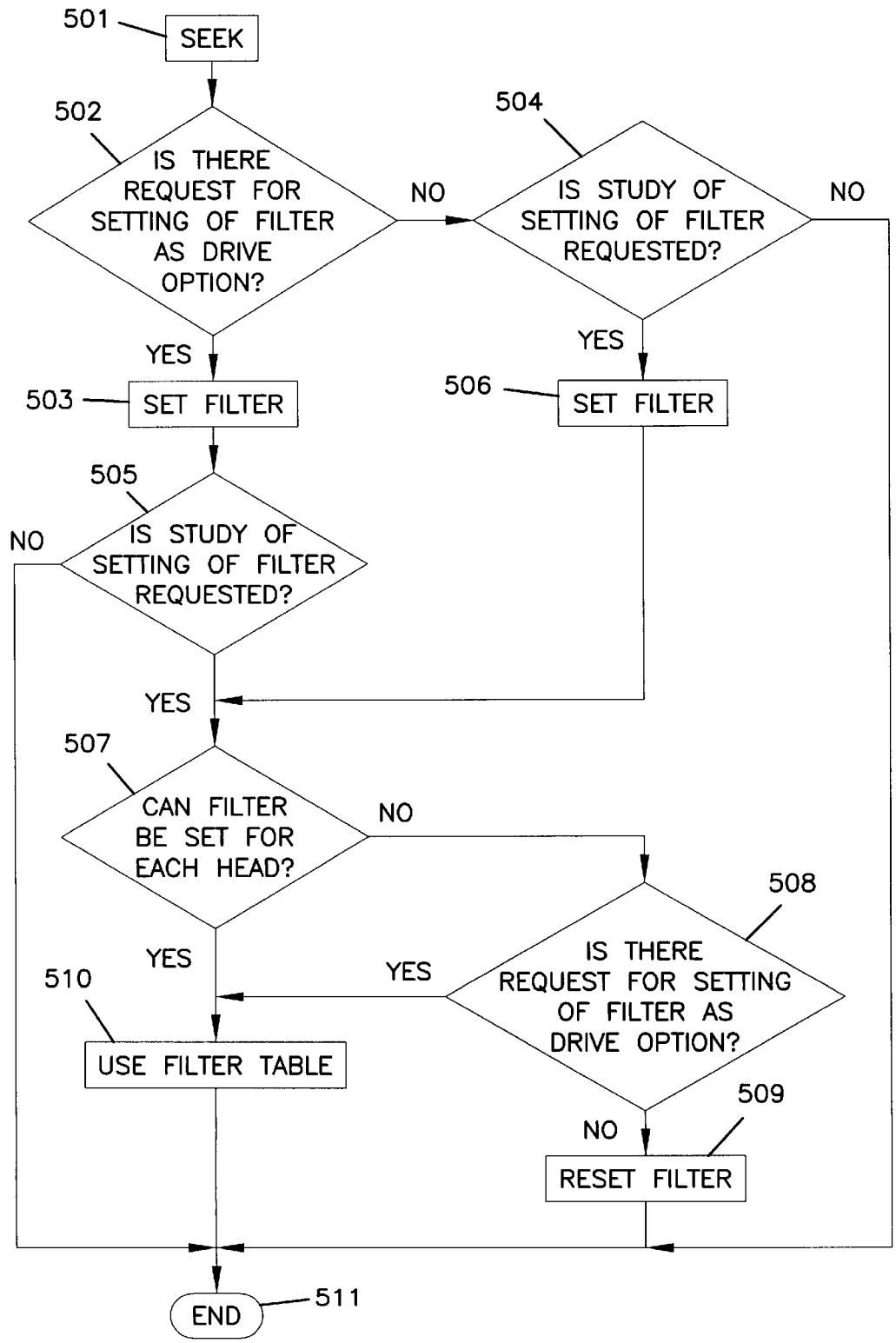
FIG. 10 is a flowchart for determining use of the filter to control the position of the head in a seek operation according to the present invention.

Referring now to FIG. 10, a flowchart of the procedure for determining use of the filter in a seek operation according to the present invention is shown. If there is a request to seek to a predetermined track in step 501, then step 502 checks if the seek operation requests that the filter be used. If YES, then the filter is set in step 503, and the process advances to step 505. If NO, then step 504 checks whether the system requests a study of the filter setting. If a study of the filter setting is requested, step 506 sets the filter. If the study setting is not requested, the procedure exits at step 511 without setting the filter.

Step 505 checks if there is a request to study the filter setting. If NO, the procedure ends at step 511 with the filter set. If YES, step 505 advances to step 507 to check if there is a request to determine use of the filter for each head. If YES, step 507 advances to step 510 to study use of the filter using the filter table. If NO, then step 507 advances to step 508. Step 508 determines if the setting of the filter is requested as a drive option. If NO, step 508 advances to step 509 in which the filter is reset, and the procedure ends at step 511. If YES, step 508 advances to step 510 to study use of the filter by using the filter table, and the procedure ends at step 511.

A number of embodiments of the present invention have been described. Nevertheless, it will be understood that various modifications may be made without departing from the spirit and the scope of the invention. Accordingly, it is to be understood that the invention is not to be limited by the specific illustrated embodiments, but only by the scope of the appended claims.

We claim:

1. A method for removing repeatable error in a disk drive the disk drive including a rotatable disk having at least one track, a head communicating with the disk, and a position control system for positioning the head above a target track, the position control system including a filter, the method comprising the steps of:

(a) determining a repeatable error from the position of the head relative to a target position, the repeatable error having a magnitude;

(b) comparing the magnitude of the repeatable error with a predetermined repeatable runout criterion; and (c) selectively activating the filter to correct the repeatable error based on a result from the comparison of the magnitude of the repeatable error with the predetermined repeatable runout criterion, the filter being enabled if the magnitude of the repeatable error exceeds the predetermined RRO criterion and disabled if the magnitude of the repeatable error does not exceed the predetermined RRO criterion.

2. The method as in claim 1, wherein steps (a)–(c) occur immediately after power on.

3. The method as in claim 1, wherein the disk is also for storing data, the head also for reading the data, and steps (a)–(c) occur prior to reading the data from the disk.

4. The method as in claim 1, wherein steps (a)–(c) occur when returning from the sleep operation.

5. The method as in claim 1, wherein steps (a)–(c) occur when a seek is requested.

6. The method as in claim 1, wherein the target position is the track center.

7. The method as in claim 1, wherein the predetermined RRO criterion is one track width.

8. An apparatus for removing repeatable error in a disk drive having a rotatable disk having at least one track and a head communicating with the disk, comprising:

a head position signal generator for determining whether a repeatable error having a magnitude occurs using the position of the head relative to a target position; and a filter coupled to the head position signal generator, the filter being selectively activated to correct the repeatable error, wherein the filter is enabled if the magnitude of the repeatable error exceeds a predetermined RRO criterion and disabled if the magnitude of the repeatable error does not exceed the predetermined RRO criterion.

9. The apparatus as in claim 8, wherein the filter modifies the head position at power on.

10. The apparatus as in claim 8, wherein the disk is also for storing data, the head also for reading the data, and the filter modifies the head position prior to reading the data from the disk.

11. The apparatus as in claim 8, wherein the filter modifies the head position when returning from the sleep operation.

12. The apparatus as in claim 8, wherein the filter modifies the head position when a seek is requested.

13. The apparatus as in claim 8, wherein the target position is the track center.

14. The apparatus as in claim 8, wherein the predetermined RRO criterion is one track width.

15. A disk drive system comprising:

a rotatable disk having at least one track;

a head communicating with the disk;

a controller coupled to the head, the controller including a head position signal generator coupled to a filter, the head position signal generator determining whether a repeatable error having a magnitude occurs using the position of the head relative to a target position, wherein the filter is selectively activated to correct the repeatable error when the head position signal generator determines a repeatable error occurs, wherein the filter is enabled if the magnitude of the repeatable error exceeds a predetermined RRO criterion and disabled if the magnitude of the repeatable error does not exceed the predetermined RRO criterion; and an actuator coupled to the controller, the actuator coupled to the head for positioning the head over the track in response to the controller.

16. The disk drive system as in claim 15, wherein the controller modifies the head position at power on.

17. The disk drive system as in claim 15, wherein the disk is also for storing data, the head also for reading the data, and the controller modifies the head position prior to reading the data from the disk.

18. The disk drive system as in claim 15, wherein the controller modifies the head position when returning from the sleep operation.

19. The disk drive system as in claim 15, wherein the controller modifies the head position when a seek is requested.

20. The disk drive system as in claim 15, wherein the target position is the track center.

21. The disk drive system as in claim 19, wherein the predetermined RRO criterion is one track width.

22. A method for removing repeatable error in a disk drive the disk drive including a rotatable disk having at least one track, a head communicating with the disk, and a position control system for positioning the head above a target track, the position control system including a filter, the method comprising:

(a) determining a repeatable error from the position of the head relative to a target position, the repeatable error having a magnitude;

(b) comparing the magnitude of the repeatable error with a predetermined RRO criterion;

(c) enabling the filter if the magnitude of the repeatable error exceeds the predetermined RRO criterion; and (d) disabling the filter if the magnitude of the repeatable error does not exceed the predetermined RRO criterion.

23. The method of claim 1, further comprising, prior to step (a), the step of:

(d) transitioning the head control system from an OFF state to an ON state.

24. The method of claim 1, wherein step (a) comprises the steps of:

(1) creating a first table of filter state variables wherein each of the filter state variables corresponds to a sector on a predetermined track on the disk;

(2) creating a second table of RRO values wherein each of the RRO values corresponds to a maximum value of the filter state variables; and (3) determining the repeatable error based on the RRO value corresponding to the maximum value of the filter state variables.

* * * * *